United States Patent
Yu (10) Patent No.: US 10,505,284 B2
(45) Date of Patent: Dec. 10, 2019

(54) ANTENNA SYSTEM

(71) Applicant: DELTA ELECTRONICS, INC., Taoyuan (TW)

(72) Inventor: Han-Hsuan Yu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/922,352

(22) Filed: Mar. 15, 2018

(65) Prior Publication Data

US 2019/0131720 A1 May 2, 2019

(30) Foreign Application Priority Data

Nov. 2, 2017 (CN) .......................... 2017 1 1065682

(51) Int. Cl.
| | |
|---|---|
| *H01Q 21/24* | (2006.01) |
| *H01Q 3/24* | (2006.01) |
| *H01Q 19/10* | (2006.01) |
| *H01Q 21/20* | (2006.01) |
| *H01Q 25/00* | (2006.01) |
| *H01Q 21/28* | (2006.01) |
| *H01Q 1/52* | (2006.01) |
| *H04B 7/00* | (2006.01) |

(52) U.S. Cl.
CPC .............. *H01Q 21/24* (2013.01); *H01Q 3/24* (2013.01); *H01Q 19/10* (2013.01); *H01Q 21/205* (2013.01); *H01Q 25/005* (2013.01); *H01Q 1/523* (2013.01); *H01Q 21/28* (2013.01); *H04B 7/00* (2013.01)

(58) Field of Classification Search
CPC .......... H01Q 21/24; H01Q 21/28; H01Q 3/24; H01Q 3/242; H01Q 19/10; H01Q 19/108; H01Q 19/12; H01Q 19/13; H01Q 19/18; H01Q 19/185
See application file for complete search history.

(56) References Cited

U.S. PATENT DOCUMENTS

| | | | |
|---|---|---|---|
| 8,995,943 B2 | 3/2015 | Corman et al. | |
| 9,263,798 B1* | 2/2016 | Piazza | ..................... H01Q 3/446 |
| 2011/0274146 A1* | 11/2011 | Huang | ..................... H01Q 1/38 |
| | | | 375/219 |

FOREIGN PATENT DOCUMENTS

| | | |
|---|---|---|
| CN | 103606759 | 2/2014 |
| CN | 105552575 | 5/2016 |
| TW | M267648 | 6/2005 |

(Continued)

*Primary Examiner* — Robert Karacsony
(74) *Attorney, Agent, or Firm* — Hauptman Ham, LLP (57) ABSTRACT

An antenna system includes a first polarized antenna module and a second polarized antenna module. The first polarized antenna module is arranged on a substrate, has a first polarized direction, and includes a switch, first antenna units and first reflecting units. The first antenna units are coupled to the switch, and a conducted first antenna unit, which is conducted by the switch, of the first antenna units has a first radiation pattern. The first reflecting units are arranged on two sides of the first antenna units respectively, and configured to adjust the first radiation pattern of the conducted first antenna unit respectively. The second polarized antenna module is arranged on the substrate, has a second polarized direction, which is perpendicular to the first polarized direction, and configured to operate with the first polarized antenna module.

10 Claims, 7 Drawing Sheets

(56) References Cited

FOREIGN PATENT DOCUMENTS

| | | |
|---|---|---|
| TW | I346420 | 8/2011 |
| TW | 201409834 | 3/2014 |
| TW | M537317 | 2/2017 |

* cited by examiner

ANTENNA SYSTEM

RELATED APPLICATIONS

This application claims priority to China Application Serial Number, 201711065682.4 filed Nov. 2, 2017, which is herein incorporated by reference.

BACKGROUND

Technical Field

The present disclosure relates to an antenna system. More particularly, the present disclosure relates to an antenna system with beam switching.

Description of Related Art

With the rapid development of wireless communication technology, the transmission stability of wireless signals and the energy intensity of wireless transmission have become increasingly important advantages in communication quality. Nowadays, the method used to solve poor communication quality includes using a multi-input multi-output (MIMO) antenna system to extend the signal coverage area, and using directional antennas to perform wireless communication with users in specific directions.

However, a large number of antennas are required when using a MIMO antenna system or directional antennas. The MIMO antenna system requires multiple antennas to cover the entire area and the directional antennas also need to be arranged in multiple locations to ensure that users in any location can receive the signal. For the above reasons, using the MIMO antenna system or the directional antennas increases the cost by requiring a large number of antennas.

Therefore, how to design an antenna system that does not need multiple antennas and may also cover all users in space is an important topic of discussion.

SUMMARY

The disclosure provides an embodiment of an antenna system, which includes a first polarized antenna module and a second polarized antenna module. The first polarized antenna module is arranged on a substrate, has a first polarized direction, and includes a switch, first antenna units and first reflecting units. The first antenna units are coupled to the switch, and a conducted first antenna unit, which is conducted by the switch, of the first antenna units has a first radiation pattern. The first reflecting units are arranged on two sides of the first antenna units respectively, and configured to adjust the first radiation pattern of the conducted first antenna unit respectively. The second polarized antenna module is arranged on the substrate, has a second polarized direction, which is perpendicular to the first polarized direction, and configured to operate with the first polarized antenna module.

BRIEF DESCRIPTION OF THE DRAWINGS

The disclosure can be more fully understood by reading the following detailed description of the embodiment, with reference made to the accompanying drawings as follows.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In some embodiments, the antenna system 100 disclosed in the present disclosure is a smart antenna system with beam switching. Beam direction of the antenna system 100 can be adjusted according to users' locations to achieve larger received signal strength indicator (RSSI).

Figure 1:
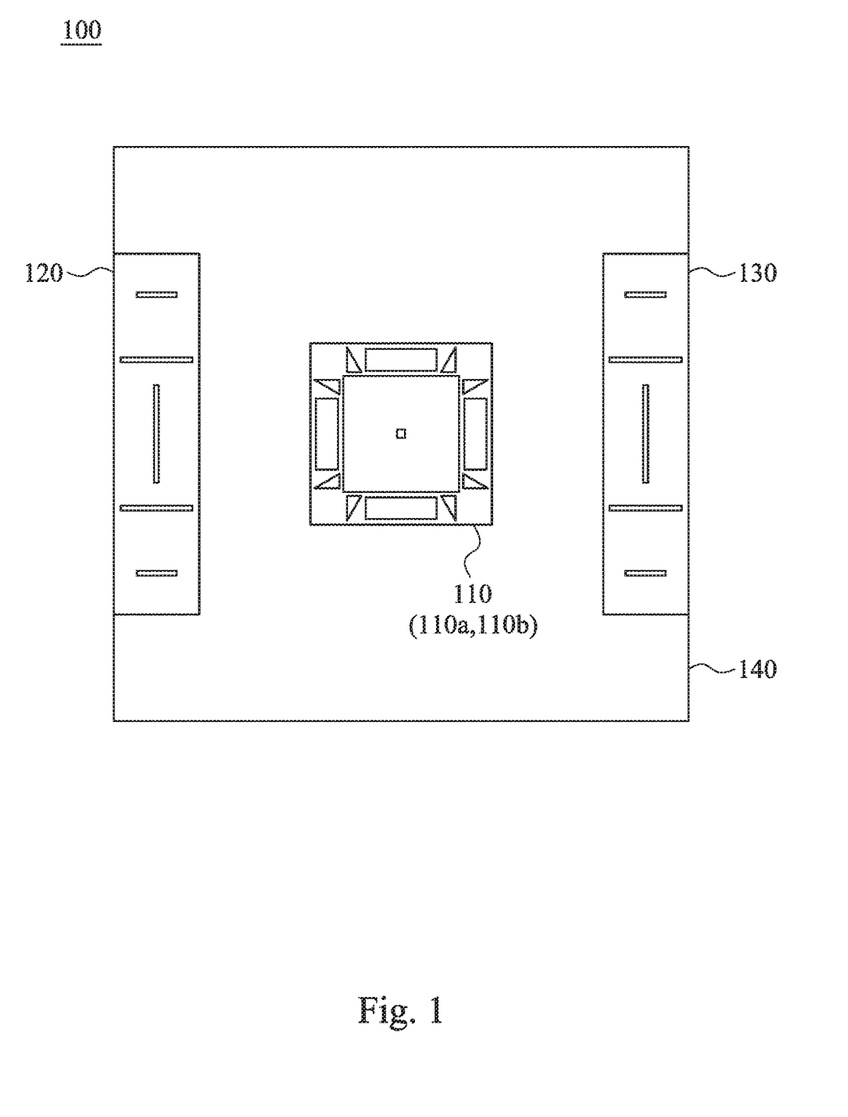
FIG. 1 is a schematic diagram illustrating an antenna system according to some embodiments of this disclosure.

FIG. 1 is a schematic diagram illustrating the antenna system 100 according to some embodiments of this disclosure. As shown in FIG. 1, in some embodiments, the antenna system 100 includes a first polarized antenna module 110, a second polarized antenna module 120, a third polarized antenna module 130 and a substrate 140, where the first polarized antenna module 110, the second polarized antenna module 120 and the third polarized antenna module 130 are arranged on the substrate 140.

In some embodiments, the substrate 140 may be a square with a length of about 10-80 cm or other shapes. However, the substrate 140 is not limited to this. The substrate of any size and shape is within the scope of the disclosure. The distance between the first polarized antenna module 110 and the second polarized antenna module 120 and/or the distance between the first polarized antenna module 110 and third polarized antenna module 130 is approximately, but not limited to, from ⅛ wavelength to 1 wavelength of low frequency band of antenna. Any size and/or any distance between the antenna modules are within the scope of the present disclosure. In this embodiment, the reason that the distance between the first polarized antenna module 110 and the second polarized antenna module 120 and the distance between the first polarized antenna module 110 and the third polarized antenna module 130 is approximately ⅛ wavelength to 1 wavelength of low frequency band of antenna, is to ensure the isolation between the first polarized antenna module 110, the second polarized antenna module 120 and the third polarized antenna module 130, and in order to avoid the mutual influence between the second polarized antenna module 120 and the third polarized antenna module 130.

In some embodiments, the first polarized antenna module 110 is, but not limited to, a horizontal polarized antenna module, and the second polarized antenna module 120 and the third polarized antenna module 130 are, but not limited to, vertical polarized antenna modules. Any polarization direction perpendicular to the other or so that signal transmission does not interfere with the other is within the scope of the present disclosure. Any number of the antenna modules arranged on the substrate is within the scope of the present disclosure. In some embodiments, the circuit arrangement of the second polarized antenna module 120 and the third polarized antenna module 130 are the same and arranged on two opposite sides of the substrate 140 to achieve a signal isolation effect. The actual arrangements and the operation methods of the first polarized antenna module 110, the second polarized antenna module 120 and the third polarized antenna module 130 will be discussed below.

In some embodiments, the first polarized antenna module 110, the second polarized antenna module 120 and the third polarized antenna module 130 of the antenna system 100 can operate simultaneously to realize a dual-polarized antenna system. The advantage of the dual-polarized antenna system is that the antenna system 100 can receive signals from two different directions or send signals to users in two different directions at the same time, and the antenna system 100 can transmit and receive signals simultaneously to provide spatial classification, to reduce multipath fading and to extend signal coverage area of the antenna system 100.

Figure 2A:
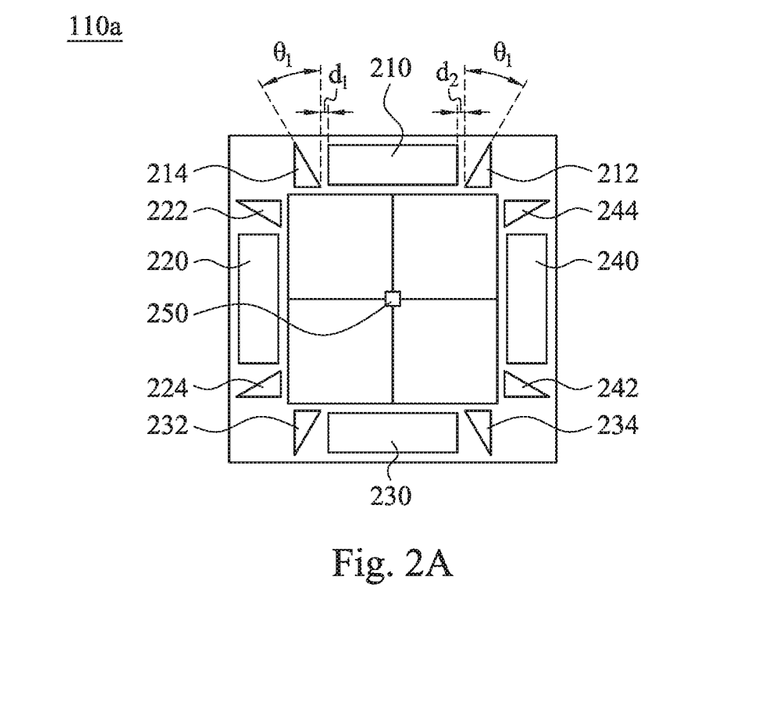
FIG. 2A is a top view diagram illustrating a first polarized antenna module according to some embodiments of this disclosure.

FIG. 2A is a top view diagram illustrating a first polarized antenna module 100a according to some embodiments of this disclosure. As shown in FIG. 2A, the first polarized antenna module 110a includes first antenna units 210, 220, 230, 240, switches 250, reflecting units 212, 214, 222, 224, 232, 234, 242 and 244, where the reflecting unit 212 and the reflecting unit 214 are arranged on two opposite sides of the first antenna unit 210, the reflecting unit 222 and the reflecting unit 224 are arranged on two opposite sides of the first antenna unit 220, the reflecting unit 232 and the reflecting unit 234 are arranged on two opposite sides of the first antenna unit 230, the reflecting unit 242 and the reflecting unit 244 are arranged on two opposite sides of the first antenna unit 240, and the first antenna units 210, 220, 230, and 240 each connects to the switch 250.

In some embodiments, the first antenna units 210, 220, 230, and 240 are dual-band antennas, where the dual-band includes, but not limited to, 2.4 GHz and 5 GHz. Any frequency is within the scope of the present disclosure. In some embodiments, the first antenna units 210, 220, 230, and 240 may be realized by, but not limited to, a planar inverted F antenna (PIFA), a dipole antenna and a loop antenna. Any suitable circuit that can be used to realize the horizontal polarized antenna unit is within the scope of the present disclosure.

In some embodiments, the switch 250 is coupled to the first antenna units 210, 220, 230, and 240, and switches according to different status to conduct one of the first antenna units 210, 220, 230, and 240, in order to make the conducted first antenna operate accordingly. In some embodiments, the switch 250 can be realized by, but not limited to, a one-to-four switch. The switching number of the switch 250 can be designed according to the number of the first antenna units 210, 220, 230, 240 of the first polarized antenna module 110a.

In some embodiments, the reflecting unit 212 and the reflecting unit 214 are used to adjust the radiation pattern of the first antenna unit 210, the reflecting unit 222 and the reflecting unit 224 are used to adjust the radiation pattern of the first antenna unit 220, the reflecting unit 232 and the reflecting unit 234 are used to adjust the radiation pattern of the first antenna unit 230, and the reflecting unit 242 and the reflecting unit 244 are used to adjust the radiation pattern of the first antenna unit 240, in order to make each of the radiation pattern of the first antenna units 210, 220, 230, and 240 become directional.

In some embodiments, the reflecting units 212, 214, 222, 224, 232, 234, 242 and 244 can be realized by, but not limited to, right triangles. Reflecting units with any shape that can achieve centralized radiation pattern are within the scope of the present disclosure. In addition, in some embodiments, the materials of the reflecting units 212, 214, 222, 224, 232, 234, 242 and 244 include, but not limited to, metal strips. Any material that can be reflective and does not cause dead angle of transmission is within the scope of the present disclosure.

In some embodiments, the distances d1 between the low frequency radiation part of the first antenna units 210, 220, 230, and 240 and the corresponding reflecting units on the left (i.e., the reflecting units 214, 224, 234, and 244) are, but not limited to, ⅛ wavelength, and the distances d2 between the high frequency radiation part of the first antenna units 210, 220, 230, and 240 and the corresponding reflecting units on the right (i.e., the reflecting units 212, 222, 232, 242) are, but not limited to, ⅛ wavelength. Any distance between the low frequency radiation part of the first antenna units 210, 220, 230, and 240 and the corresponding reflecting units on the left as well as the high frequency radiation part of the first antenna units 210, 220, 230, and 240 and the corresponding reflecting units on the right is within the scope of the present disclosure. For example, as shown in FIG. 2A, the distance between the low frequency radiation part of the first antenna unit 210 and the corresponding reflecting unit 214 is d1, and the distance between the high frequency radiation part of the first antenna unit 210 and the corresponding reflecting unit 212 is d2. In some embodiments, the distance d1 may be 12-16 millimeters, and the distance d2 may be 7-9 millimeters.

In some embodiments, the reflecting units 212, 214, 222, 224, 232, 234, 242 and 244 are not coupled to the ground, and the angles between the reflecting units 212, 214, 222, 224, 232, 234, 242, 244 and the corresponding one of the first antenna units 210, 220, 230, and 240 are, but not limited to, θ1. Any angle between the reflecting units 212, 214, 222, 224, 232, 234, 242, 244 and the corresponding one of the first antenna units 210, 220, 230, 240 is within the scope of the present disclosure. For example, as shown in FIG. 2A, the angle between the reflecting unit 212 and the first antenna unit 210 is θ1. In some embodiments, the range of the angle θ1 may be 30-45 degrees.

Figure 2B:
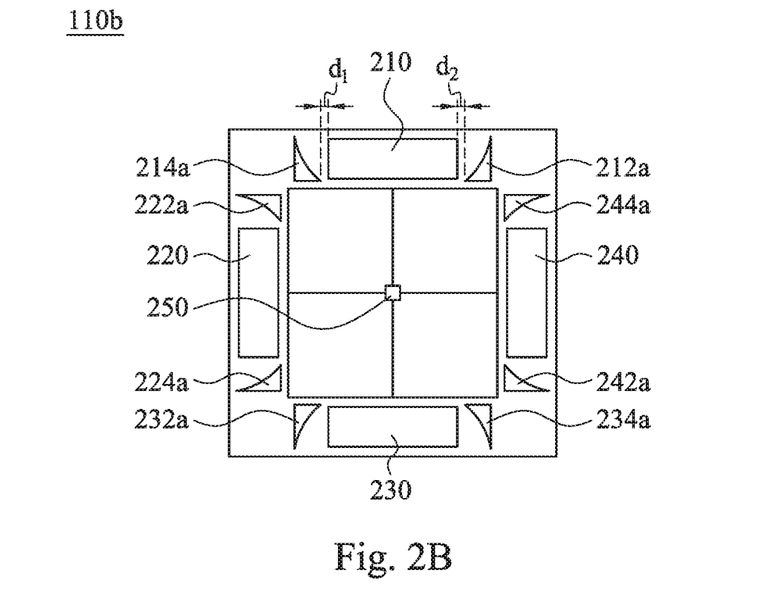
FIG. 2B is a top view diagram illustrating a first polarized antenna module according to some embodiments of this disclosure.

FIG. 2B is a top view diagram illustrating a first polarized antenna module 110b according to some embodiments of this disclosure. As shown in FIG. 2B, the first polarized antenna module 110b includes the first antenna units 210, 220, 230, 240, the switch 250, reflecting units 212a, 214a, 222a, 224a, 232a, 234a, 242a, and 244a, where the reflecting surfaces of the reflecting units 212a, 214a, 222a, 224a, 232a, 234a, 242a, and 244a are circular-arc, and the materials of the reflecting units 212a, 214a, 222a, 224a, 232a, 234a, 242a, and 244a are the same as the materials of the reflecting units 212, 214, 222, 224, 232, 234, 242 and 244.

Figure 3:
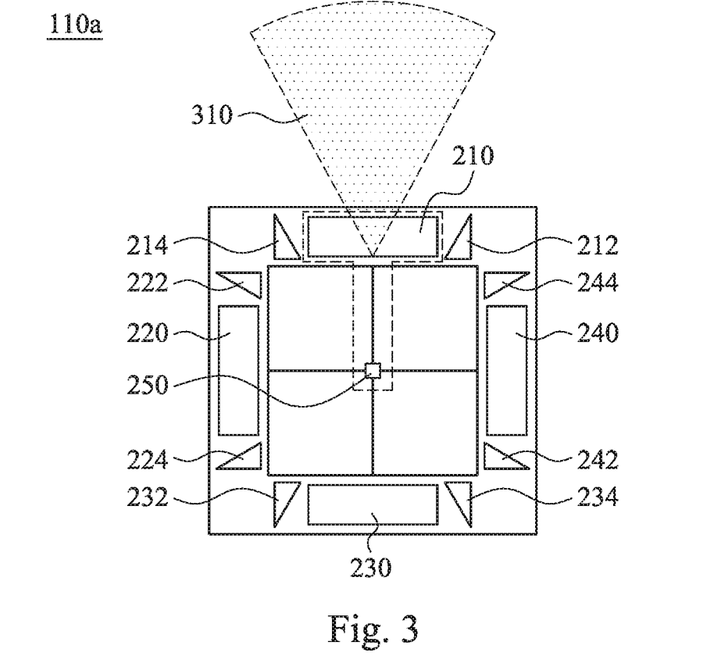
FIG. 3 is an operation diagram illustrating the first polarized antenna module in FIG. 2A according to some embodiments of this disclosure.

FIG. 3 is an operation diagram illustrating the first polarized antenna module 110a in FIG. 2A according to some embodiments of this disclosure. As shown in FIG. 3, in some embodiments, when the first antenna unit 210 is turned on (i.e., conducted) by the switch 250, the first antenna units 220, 230, and 240 are then turned off. In this situation, the first polarized antenna module 110a generates a beam 310 transmitted upward as shown in FIG. 3 through the cooperative operation of the first antenna unit 210 and the reflecting units 212, 214. In some embodiments, the frequency band of the beam 310 is 2.4 GHz or 5 GHz.

Similarly, when the first antenna unit 220 is turned on by the switch 250, the first antenna units 210, 230, and 240 are then turned off. In this situation, the first polarized antenna module 110a generates a beam (not shown) transmitted to the left of FIG. 3 through the cooperative operation of the first antenna unit 220 and the reflecting units 222, 224. In some embodiments, the frequency band of the said beam is 2.4 GHz or 5 GHz. When the first antenna unit 230 is turned on by the switch 250, the first antenna units 210, 220, and 240 are then turned off. In this situation, the first polarized antenna module 110a generates a beam (not shown) transmitted to the bottom of FIG. 3 through the cooperative operation of the first antenna unit 230 and the reflecting units 232, 234. In some embodiments, the frequency band of the said beam is 2.4 GHz or 5 GHz. When the first antenna unit 240 is turned on by the switch 250, the first antenna units 210, 220, and 230 are then turned off. In this situation, the first polarized antenna module 110a generates a beam (not shown) transmitted to the right of FIG. 3 through the cooperative operation of the first antenna unit 240 and the reflecting units 242, 244. In some embodiments, the frequency band of the said beam is 2.4 GHz or 5 GHz.

In some embodiments, the operation mode of the first polarized antenna module 110b in FIG. 2B is the same as the operation mode of the first polarized antenna module 110a. Therefore, the operation mode of the first polarized antenna module 110b will not be repeated herein.

Figure 4A:
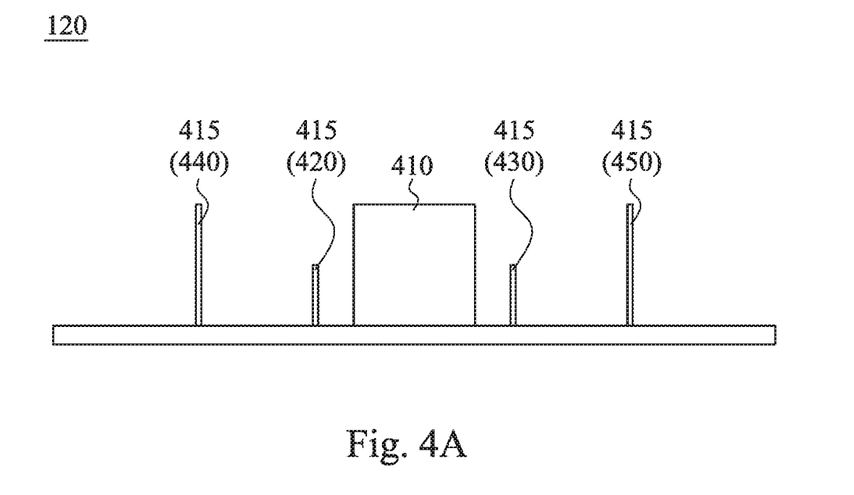
FIG. 4A is a side view diagram illustrating a second polarized antenna module according to some embodiments of this disclosure.

FIG. 4A is a side view diagram illustrating a second polarized antenna module 120 according to some embodiments of this disclosure. As shown in FIG. 4A, in some embodiments, the second polarized antenna module 120 includes a second antenna unit 410 and second reflecting units 415, where the second reflecting units 415 include reflecting boards 420, 430, 440, and 450. In some embodiments, the reflecting board 420 and the reflecting board 440 are arranged on a first side of the second antenna unit 410, and the reflecting board 430 and the reflecting board 450 are arranged on a second side opposite to the first side of the second antenna unit 410. In some embodiments, the second polarized antenna module 120 includes, but not limited to, four reflecting boards. Any dual number of the reflecting boards arranged on two opposite sides of the second antenna unit 410 is within the scope of the present disclosure.

In some embodiments, the second antenna unit 410 is operated under dual frequency bands, where the dual frequency bands include, but not limited to, 2.4 GHz and 5 GHz. Any frequency band is within the scope of the present disclosure. In some embodiments, the second antenna unit 410 may be realized by, but not limited to, a PIFA, a dipole antenna and a loop antenna. Any suitable circuit may be used to realize the vertical polarized antenna unit is within the scope of the present disclosure.

In some embodiments, the height of the reflecting board 420 and the reflecting board 430 are the same, and the height of the reflecting board 440 and the reflecting board 450 are the same. The reflecting board 440 and the reflecting board 450 are higher than the reflecting board 420 and the reflecting board 430. In some embodiments, the height of the reflecting board 440 is, but not limited to, twice of the height of the reflecting board 420. Any height of the reflecting boards 420, 430, 440, 450 that can be used to adjust the radiation pattern of the second antenna unit 410 is within the scope of the present disclosure. In some embodiments, the height of the reflecting boards 420, 430, 440, 450 are corresponding to the height of the second antenna unit 410. For example, the height of the reflecting board 420 should higher than the height of the high frequency radiation part of the second antenna unit 410, and the height of the reflecting board 440 should higher than the height of the low frequency radiation part of the second antenna unit 410.

In some embodiments, the reflecting boards 420, 430, 440, 450 can be realized by, but not limited to, thin metal strips with line widths 3 millimeters to 5 millimeters. Any reflecting board that can be used to adjust the radiation pattern is within the scope of the present disclosure.

Figure 4B:
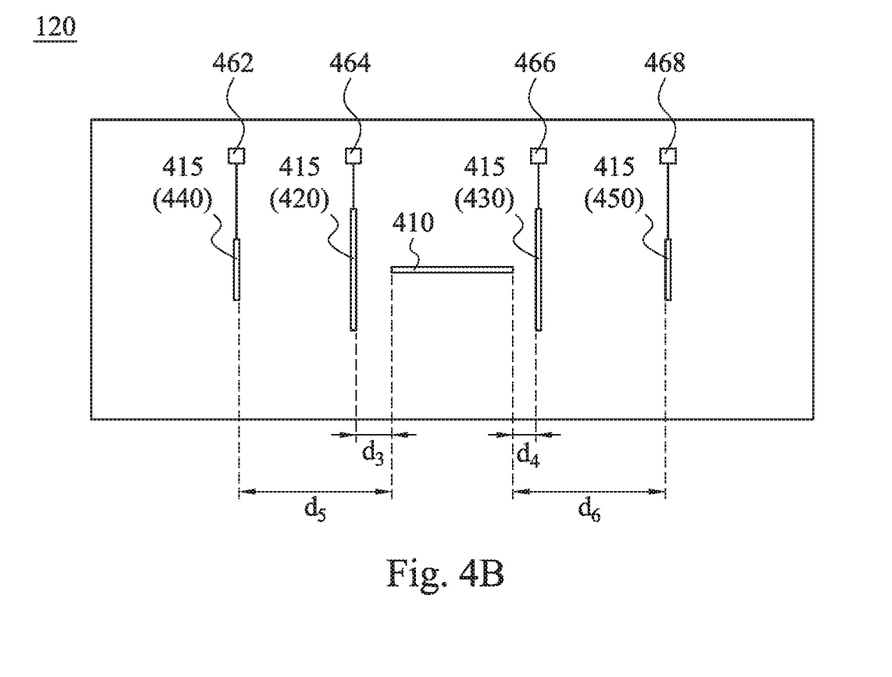
FIG. 4B is a top view diagram illustrating a second polarized antenna module according to some embodiments of this disclosure.

FIG. 4B is a top view diagram illustrating a second polarized antenna module 120 according to some embodiments of this disclosure. As shown in FIG. 4B, in some embodiments, the second polarized antenna module 120 further includes switches 462, 464, 466, and 468, where the switch 462 is coupled to the reflecting board 440, the switch 464 is coupled to the reflecting board 420, the switch 466 is coupled to the reflecting board 430, and the switch 468 is coupled to the reflecting board 450. In some embodiments, the switches 462, 464, 466, and 468 are coupled to an electronic chip to control the switches to turn off or turn on the corresponding reflecting board. For example, the electronic chip controls the switch 462 to turn off or turn on the reflecting board 440.

In actual operation, when the switch turns off so that the reflecting board and the electronic chip are not conducted, the reflecting board works as a director. By comparison, when the switch turns on so that the reflecting board and the electronic chip are conducted, the reflecting board works as a reflector. In some embodiments, the switches 462, 464, 466, and 468 can be realized by, but not limited to, diodes. Any electronic element that can be used to turn off or turn on the reflecting boards is within the scope of the present disclosure.

In some embodiments, the distance d3 between the reflecting board 420 and the second antenna unit 410 and the distance d4 between the reflecting board 430 and the second antenna unit 410 are the same, and the distance d5 between the reflecting board 440 and the second antenna unit 410 and the distance d6 between the reflecting board 450 and the second antenna unit 410 are the same. In some embodiments, the distance d3 between the reflecting board 420 and the second antenna unit 410 and the distance d4 between the reflecting board 430 and the second antenna unit 410 are both from ⅛ wavelength to ¼ wavelength of the high frequency band, and the distance d5 between the reflecting board 440 and the second antenna unit 410 and the distance d6 between the reflecting board 450 and the second antenna unit 410 are both from ⅛ wavelength to ¼ wavelength of the low frequency band. For example, the range of the distance d3 and the distance d4 are from 7.5 millimeters to 15 millimeters, and the range of the distance d5 and distance d6 are from 15.6 millimeters to 30 millimeters.

Figure 5A:
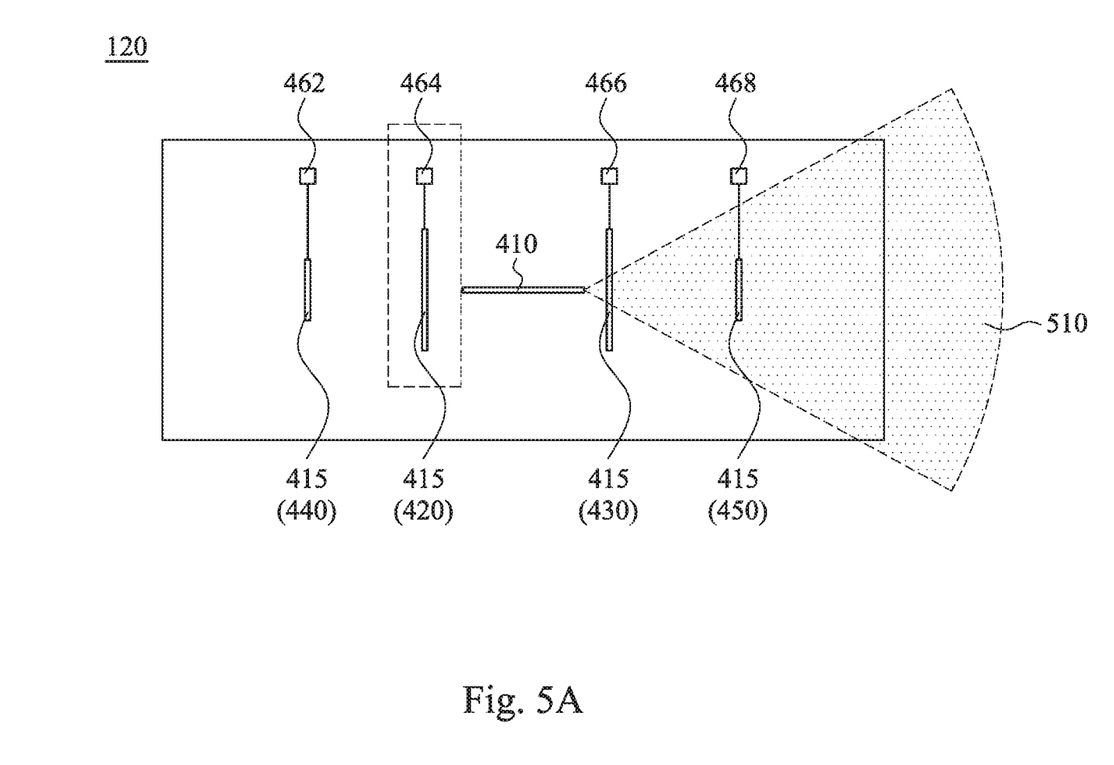
FIG. 5A, FIG. 5B and FIG. 5C are operation diagrams illustrating the second polarized antenna module in FIG. 4B according to some embodiments of this disclosure.
Figure 5B:
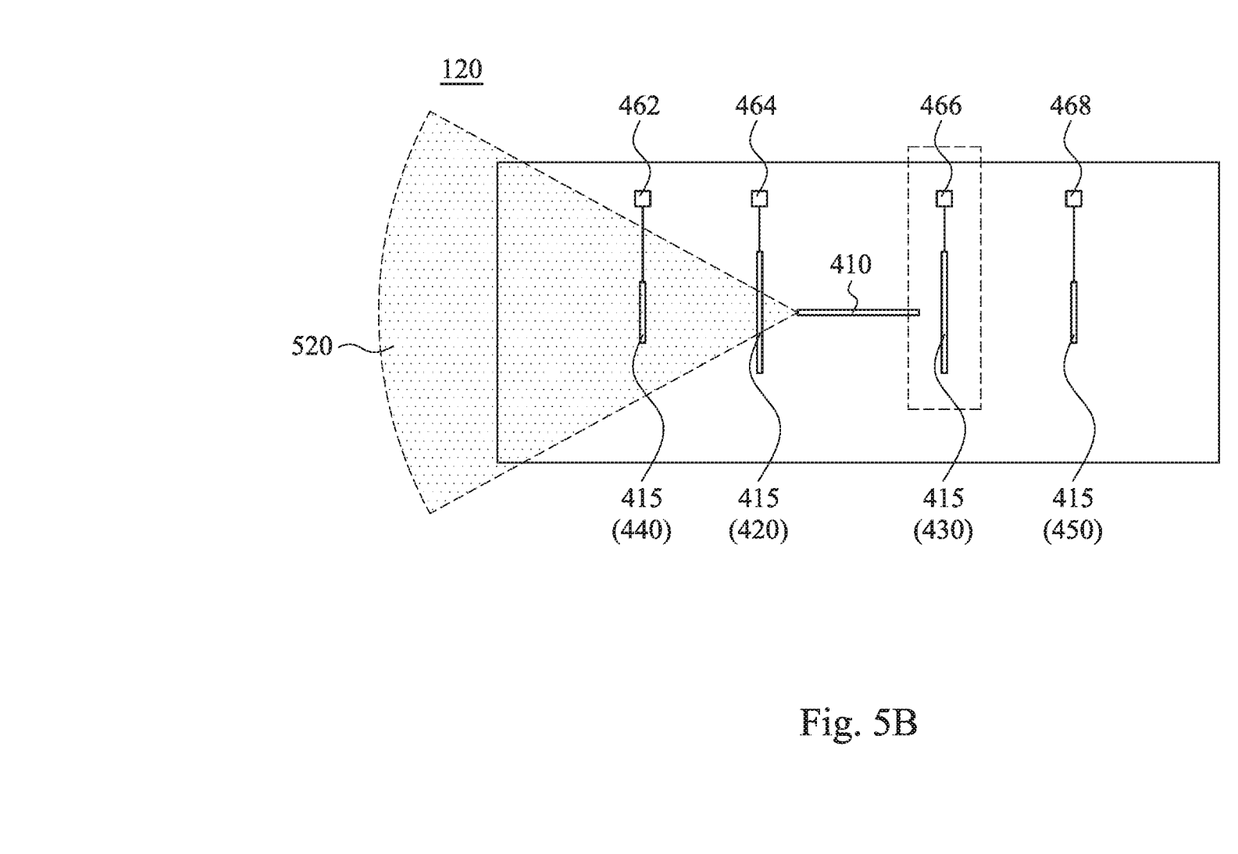
Figure 5C:
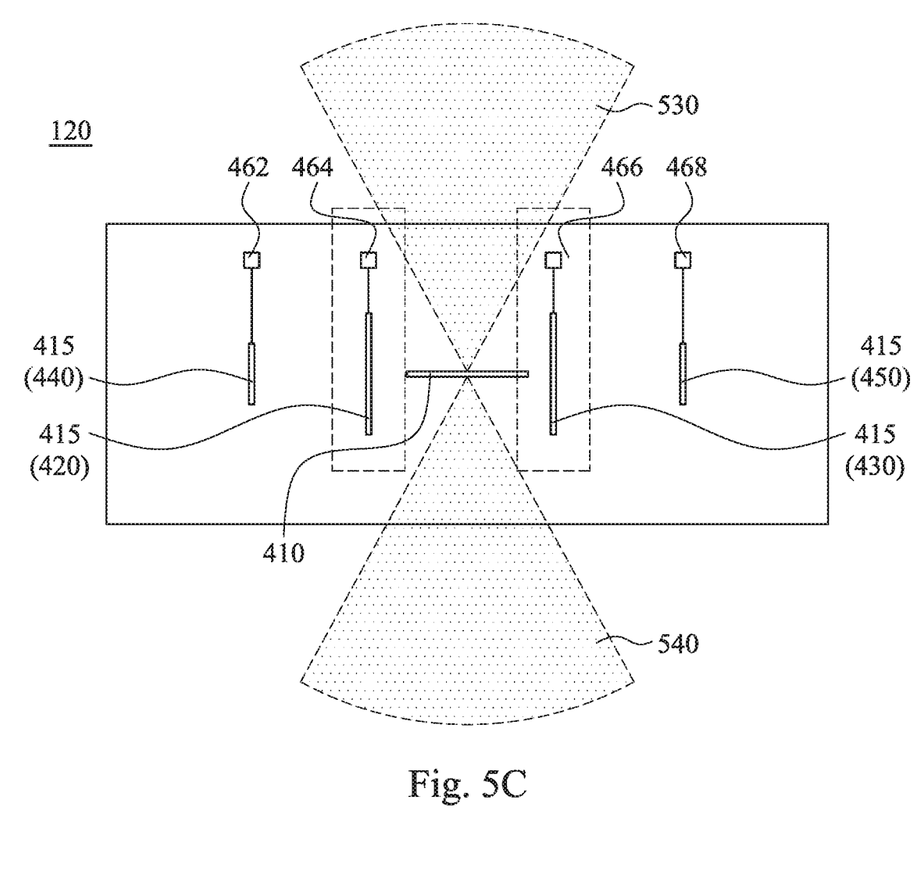

FIG. 5A, FIG. 5B and FIG. 5C are operation diagrams illustrating the second polarized antenna module 120 in FIG. 4B according to some embodiments of this disclosure. As shown in FIG. 5A, in some embodiments, when only the switch 464 is turned on to activate the reflecting board 420, the second polarized antenna module 120 generates a beam 510 transmitted to the right of FIG. 5A through the cooperative operation of the second antenna unit 410 and the reflecting board 420. In some embodiments, the frequency band of the beam 510 is 5 GHz. As shown in FIG. 5B, in some embodiments, when only the switch 466 is turned on to activate the reflecting board 430, the second polarized antenna module 120 generates a beam 520 transmitted to the left of FIG. 5B through the cooperative operation of the second antenna unit 410 and the reflecting board 430. In some embodiments, the frequency band of the beam 520 is 5 GHz. As shown in FIG. 5C, in some embodiments, when the switch 464 is turned on to activate the reflecting board 420 and the switch 466 is turned on to activate the reflecting board 430, the second polarized antenna module 120 generates a beam 530 transmitted to the top of FIG. 5C and a beam 540 transmitted to the bottom of FIG. 5C through the cooperative operation of the second antenna unit 410 and the reflecting boards 420, 430. In some embodiments, the frequency bands of the beams 520 and 530 are 5 GHz.

Similarly, when only the switch 462 is turned on to activate the reflecting board 440, the second polarized antenna module 120 generates a beam (not shown)transmitted to the right of FIG. 5A through the cooperative operation of the second antenna unit 410 and the reflecting board 440. In some embodiments, the frequency band of the said beam is 2.4 GHz. When only the switch 468 is turned on to activate the reflecting board 450, the second polarized antenna module 120 generates a beam (not shown) transmitted to the left of FIG. 5B through the cooperative operation of the second antenna unit 410 and the reflecting board 450. In some embodiments, the frequency band of the said beam is 2.4 GHz. When the switch 462 is turned on to activate the reflecting board 440 and the switch 468 is turned on to activate the reflecting board 450, the second polarized antenna module 120 generates a beam (not shown) transmitted to the top of FIG. 5C and a beam (not shown) transmitted to the bottom of FIG. 5C through the cooperative operation of the second antenna unit 410 and the reflecting boards 440, 450. In some embodiments, the frequency bands of the said beams are 2.4 GHz.

In actual operation, when a user is detected in a specific beam footprint, the switches of the antenna system 100 are switched to adjust beams' directions to point to the user, in order to achieve the largest RSSI.

As a result, the present disclosure combines two different antenna modules to achieve the beam switching function under different frequency bands and has a characteristic of dual polarization (both the vertical polarization and the horizontal polarization).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna system, comprising:
a first polarized antenna module arranged on a substrate and having a first polarized direction, wherein the first polarized antenna module comprises:
 a first switch;
 a plurality of first antenna units coupled to the first switch, wherein a conducted first antenna unit, which is conducted by the first switch, of the first antenna units has a first radiation pattern; and
 a plurality of first reflecting units arranged on two sides of the first antenna units respectively, and the first reflecting units each configured to adjust the first radiation pattern of the conducted first antenna unit; and
a second polarized antenna module arranged on the substrate, configured to cooperate with the first polarized antenna module, and having a second polarized direction which is perpendicular to the first polarized direction,
wherein the second polarized antenna module comprises:
 a plurality of second switches;
 a second antenna unit having a second radiation pattern; and
 a plurality of second reflecting units arranged on two sides of the second antenna unit and coupled to the second switches respectively, wherein at least one of the second reflecting units is conducted by the second switches and the second reflecting units are each configured to adjust the second radiation pattern.

2. The antenna system of claim 1, wherein the first switch and one of the second switches are each configured to be switched to change a pattern of the antenna system.

3. The antenna system of claim 1, wherein the first polarized antenna module and the second polarized antenna module are operated under a plurality of frequency bands, wherein the frequency bands comprise 2.4 GHz and 5 GHz.

4. The antenna system of claim 1, wherein the second reflecting units comprising:
a first reflecting board;
a second reflecting board, wherein the first reflecting board and the second reflecting board are arranged on two opposite sides of the second antenna units respectively;
a third reflecting board arranged between the first reflecting board and the second antenna unit; and
a fourth reflecting board arranged on other side opposite to the third reflecting board.

5. The antenna system of claim 4, wherein heights of the first reflecting board and the second reflecting board perpendicular to the substrate are a first height, and heights of the third reflecting board and the fourth reflecting board perpendicular to the substrate are a second height, wherein the first height is larger than the second height.

6. The antenna system of claim 1, wherein the first antenna units are each arranged on four sides of a square, and the first reflecting units are arranged on two sides of the first antenna units respectively.

7. The antenna system of claim 1, wherein distances between the first reflecting units and the first antenna units are ⅛ wavelength.

8. The antenna system of claim 1, wherein shapes of the first reflecting units are right triangles or shapes of reflecting surfaces of the first reflecting units are circular-arc.

9. An antenna system, comprising:
- a first polarized antenna module arranged on a substrate and having a first polarized direction, wherein the first polarized antenna module comprises:
  - a first switch;
  - a plurality of first antenna units coupled to the first switch, wherein a conducted first antenna unit, which is conducted by the first switch, of the first antenna units has a first radiation pattern; and
  - a plurality of first reflecting units arranged on two sides of the first antenna units respectively, and the first reflecting units each configured to adjust the first radiation pattern of the conducted first antenna unit;
- a second polarized antenna module arranged on the substrate, configured to cooperate with the first polarized antenna module, and having a second polarized direction which is perpendicular to the first polarized direction; and
- a third polarized antenna module arranged on other side opposite to the second polarized antenna module of the substrate and having the second polarized direction.

10. The antenna system of claim 9, wherein the third polarized antenna module comprises:
- a plurality of third switches;
- a third antenna unit having a third radiation pattern; and
- a plurality of third reflecting units coupled to the third switches respectively and each arranged on two sides of the third antenna unit, wherein the third reflecting units are each configured to adjust the third radiation pattern of the third antenna unit.

* * * * *